C. O. ANDERSON.
MILKING MACHINE.
APPLICATION FILED DEC. 15, 1916.
1,266,544.
Patented May 21, 1918.
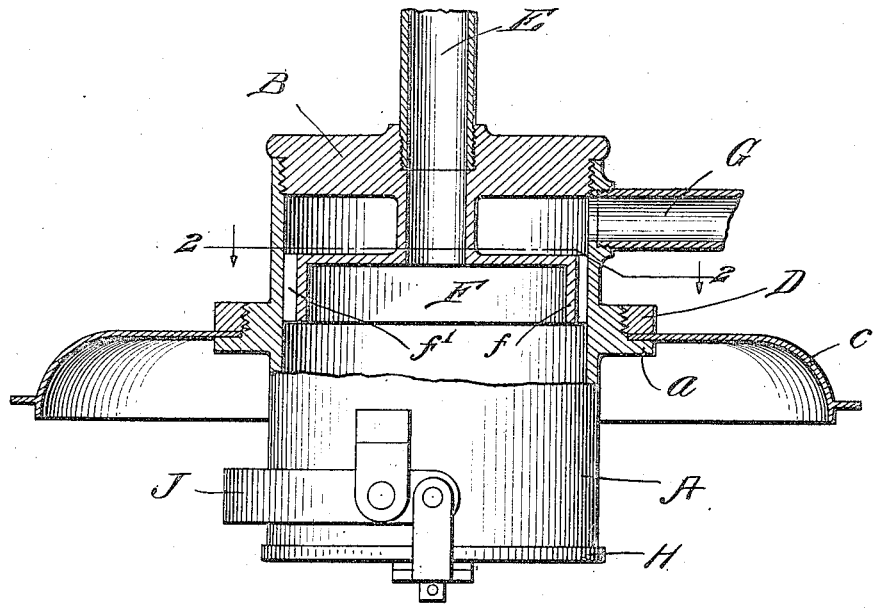
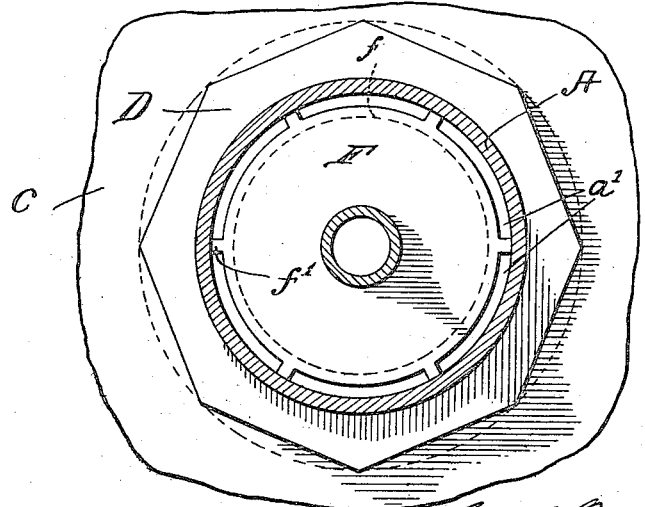
Witnesses
Inventor
Carl Oscar Anderson
By his Attorney

UNITED STATES PATENT OFFICE.

CARL OSCAR ANDERSON, OF LANCASTER, PENNSYLVANIA.

MILKING-MACHINE.

1,266,544. Specification of Letters Patent. Patented May 21, 1918.

Application filed December 15, 1916. Serial No. 137,259.

*To all whom it may concern:*

Be it known that I, CARL OSCAR ANDERSON, a citizen of the United States, residing at Lancaster, in the county of Lancaster and State of Pennsylvania, have invented certain new and useful Improvements in Milking-Machines; and I do hereby declare the following to be a full, clear, and exact description of the invention, such as will enable others skilled in the art to which it appertains to make and use the same.

This invention relates to milking machines of the type in which the teat is subjected to intermittent or pulsating suction, and more particularly to vacuum chambers for use in connection with such apparatus.

The object of the invention is to provide a vacuum chamber of novel construction with means to prevent foaming and waste of the milk and consisting of few separable parts which may be easily disassembled for cleansing purposes.

The invention will first be hereinafter more particularly described, with reference to the accompanying drawings, which are to be taken as a part of this specification, and then pointed out in the claims at the end of the description.

In the drawings, Figure 1 shows my improved vacuum milk chamber, partly in elevation and partly in section, attached to the lid or cover of an ordinary milk receptacle; and Fig. 2 represents a section of the same, taken on the line 2—2 of Fig. 1.

In said drawings, in which the same reference letters are used to denote corresponding parts in different views, the letter A denotes the milk chamber, which is provided with a cap B. This milk chamber is detachably secured to a lid or cover C, of an ordinary bucket or tin can for the retention of the milk as it is drawn from the cow; said lid having an opening therein to adapt it to fit over the cylindrical chamber and rest upon a flange $a$ projecting from a boss on the exterior of said chamber having a nut D screwed thereon to hold the lid in place. The cap B is screwed into the top of the milk chamber, and has a metal tube E screwed thereon for connection with the usual suction device (not shown). Said tube E registers with a centrally disposed air outlet port in the cap, and the latter is formed or provided with a pendant tubular portion carrying an inverted cup-like member F between which and the cap is provided an annular space $a^1$ into which the milk is drawn by the suction through the inlet tube G, which tends to create a vacuum in said annular space and also in the inverted cup-like member F. This member F is preferably formed integrally with the tubular part depending from the cup B and with a depending flange $f$ on which there are projections $f^1$ whereby arc-shaped spaces are provided between said flange $f$ and the interior of the vacuum chamber, thus forming narrow passages down which the milk flows in a thin sheet or column. The projections $f^1$ are preferable but may be omitted. A valve H on the lower end of the vacuum chamber is held normally closed by a counter weight J, which is pivoted intermediate its ends on the exterior of said chamber, so that the slightest overbalancing of the weight on said valve by the milk within the chamber will open the valve and permit the milk to flow out thereover into the can or bucket over which the chamber is mounted.

In operation, the milk is drawn from the cow through the tube G by intermittent suction through the tube E, and as it enters the annular space $a^1$ it is spread out over the upper surface of the disk or top of the cup-like member F and flows downwardly through the annular space or passages between the periphery of the flange $f$ and the inner wall of the vacuum chamber in thin separate sheets or columns to the lower part of the milk chamber where, as it collects therein, it will overbalance and open the weighted valve H, so as to allow the milk to escape into a proper receptacle below, whereupon the valve will be automatically closed by the overbalancing counterweight and remain closed until the weight of the milk is sufficient to again open the valve. This operation continues through each of the pulsating periods.

It will be readily seen that the milk is kept sufficiently distant from the suction opening to prevent any of the milk from being drawn therethrough, which would not only foul the milk but would also impair the operation of the suction device, and by spreading it over the disk or top of the cup-like member of the vacuum chamber until it finds exit through the passages around the pendant marginal flange it is prevented from foaming, which might otherwise occur, so that no moisture therefrom can pass through the suction opening.

My improvement has the advantage over other constructions heretofore employed for the same purpose of simplicity of construction, efficiency and durability in practical use and ease of disassembling for cleansing purposes to a marked degree, as will be readily understood.

Having thus described my invention, what I claim as new and desire to secure by Letters Patent of the United States is:

1. In a milking machine, a vacuum chamber having in the upper portion thereof a milk inlet and a cover having an air outlet port and carrying a disk separated from the cover so as to provide an annular space in communication with said milk inlet; said disk having a pendant annular flange slightly separated from the inner wall of the vacuum chamber so as to leave a narrow passage therebetween, whereby the milk entering said annular space is spread out over the surface of said disk and caused to flow downwardly in a thin sheet through said passage.

2. In a milking machine, a vacuum chamber having in the upper portion thereof a milk inlet and a cover having an air inlet port therethrough and carrying a disk separated from the cover so as to provide an annular space between the cover and disk in communication with said milk inlet; said disk having a depending annular marginal flange with projections thereon so as to provide narrow passages between said marginal flange and the inner wall of the vacuum chamber, whereby the milk entering said annular space is spread out over the surface of said disk and caused to flow downwardly in thin separate sheets or columns through said passage.

3. In a milking machine, a vacuum chamber having a top or cover provided with a depending centrally-disposed tubular portion, an inverted cup-like member supported by said tubular portion within and separated from said chamber, so as to provide an annular space between said member and said top, a milk inlet opening into said annular space, and an air outlet in communication with said tubular portion for connection with a suction tube; said cup-like member having a depending marginal annular flange slightly separated from the inner wall of said chamber so as to provide a milk passage between said flange and said wall.

4. In a milking machine, a vacuum chamber provided at its upper end with a cover having a centrally disposed air outlet for connection with a suction tube, a disk suspended from said cover by means of a tubular connection with said outlet; said disk having an annular marginal flange surrounding said outlet and slightly separated from the inner wall of said chamber so as to provide an annular discharge space around said flange, a vacuum chamber below and an annular milk inlet space above said disk, a milk inlet communicating with said annular inlet space, and a valved milk outlet at the bottom of said chamber, together with means for supporting said chamber over a suitable receptacle for the milk.

In testimony whereof I affix my signature in the presence of two witnesses.

CARL OSCAR ANDERSON.

Witnesses:
CHAS. E. RIORDON,
BENJAMIN B. DOWELL.

Copies of this patent may be obtained for five cents each, by addressing the "Commissioner of Patents, Washington, D. C."